Dec. 28, 1948.                  A. PREISMAN                2,457,176
                            WAVE GENERATING SYSTEM
                              Filed Jan. 23, 1943
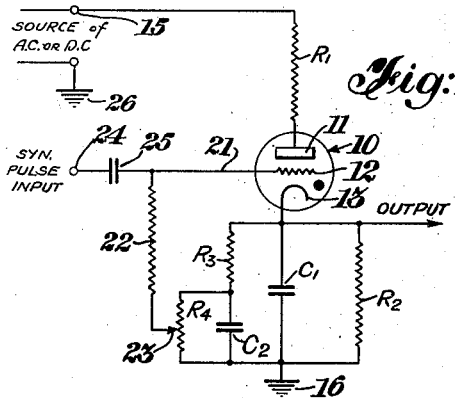
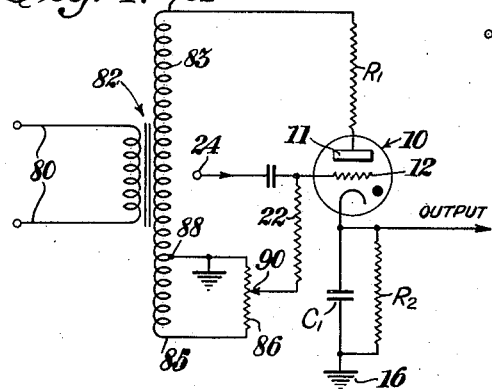
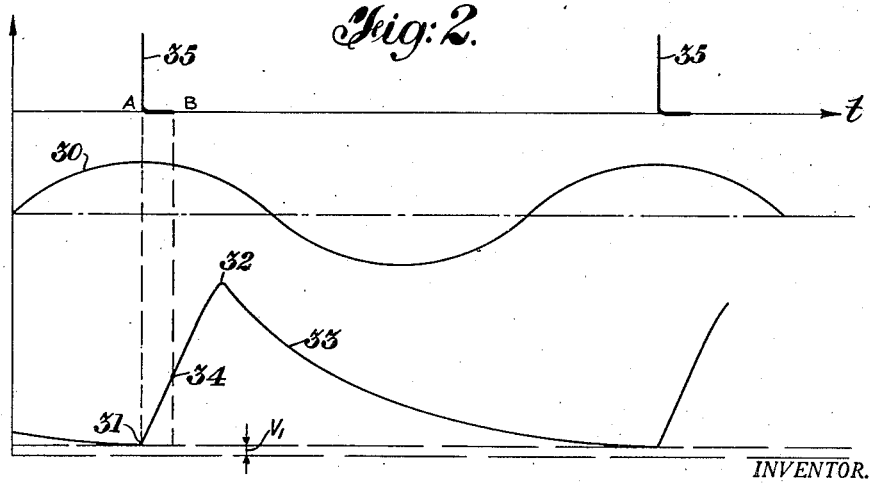
INVENTOR.
ALBERT PREISMAN
BY
*Percy P. Lantry*
ATTORNEY Patented Dec. 28, 1948

2,457,176

UNITED STATES PATENT OFFICE 2,457,176

WAVE GENERATING SYSTEM

Albert Preisman, Flushing, N. Y., assignor to Federal Telephone and Radio Corporation, Newark, N. J., a corporation of Delaware Application January 23, 1943, Serial No. 473,312

4 Claims. (Cl. 315—229)

This invention relates to cathode ray oscillographs and more particularly to the generation of a saw-tooth voltage wave which may be used as the sweep potential for oscillographs.

The invention disclosed herein may be manufactured and used by or for the Government of the United States for governmental purposes without payment of any royalty thereon.

One of the objects of this invention is to provide a method and means to produce saw-tooth voltage waves by operation of gas discharge means on either direct or alternating current.

Another object of this invention is to provide a method and means for producing a saw-tooth voltage wave wherein the initiation of each saw-tooth potential is synchronized according to a selected point on a cycle of a source of alternating current.

The method of this invention comprises, for example, application of a source of current either direct or alternating to gas discharge means which may comprise one or more gas discharge tubes, and control of the firing of the gas discharge means either by a suitable biasing arrangement or by the application of synchronizing pulses. The conduction of the gas discharge means during the firing interval is used to build up a potential on an energy storing device, such as a condenser, thereby defining a leading edge for the saw-tooth wave. The firing or conduction of the gas discharge means is discontinued when a predetermined potential build-up is reached. The discharge of the stored energy is controlled to effect a desired potential drop defining a trailing edge for the wave. For either alternating or direct current a source of synchronizing pulses may be employed to control the operation. Where direct current is used, the bias may be so selected as to cause the tube automatically to fire periodically, or, if desired, the firing may be caused by a source of synchronizing pulses. Where alternating current is used as the power source, the gas discharge means may be biased so that firing occurs at a predetermined point on the rising portion of a positive half of an alternating current cycle or to cause firing to occur two or more times during the half cycle. The gas discharge means, however, may be biased so that it will not fire during an alternating current cycle unless a synchronizing pulse is applied thereto. The application of a synchronizing pulse, however, provides a wider selection of the firing point along the wave of the alternating current.

While my invention for producing saw-tooth voltage waves can be supplied from a source of either direct or alternating current, it is particularly useful as a sweep generator for an obstacle detection system using alternating current directly as the sole source of power. Such a system is disclosed in the copending application of E. Labin, entitled Radio transmitting and receiving system, Serial No. 473,310, filed January 23, 1943, now Patent No. 2,454,810. The Labin system comprises generally a transmitter, a receiver, an oscillograph and a sweep generator. These elements are all supplied directly with an alternating current source. The method and means of generating a saw-tooth voltage wave as herein disclosed is particularly adaptable as the sweep generator in the Labin system.

For a further understanding of the method and of means by which the method may be practiced, reference may be had to the following detailed description to be read in connection with the accompanying drawings, in which:

Fig. 1 is a schematic illustration of a saw-tooth voltage wave generator in accordance with my invention;

Fig. 2 is a graphical illustration showing the relationship of the saw-tooth wave with respect to an alternating current source from which it may be produced, and;

Figs. 3 and 4 are schematic illustrations of two additional modified forms of saw-tooth voltage generator of my invention.

Referring to Fig. 1 of the drawings, the saw-tooth voltage generator therein shown comprises a gas discharge tube 10 which preferably is the type known under trade mark as "Thyratron." The tube comprises an anode 11, a grid 12 and a cathode 13. The anode 11 is connected through a resistor $R_1$ to an input terminal 15. Connected between the cathode 13 and the ground 16 is an energy storing device such as a condenser $C_1$. Shunting the condenser $C_1$ is a resistor $R_2$.

Since the condenser $C_1$ retains a residual charge, as more particularly hereinafter described, this residual voltage can be used as a biasing potential for the grid 12. This is accomplished by connecting the grid lead 21 via a resistor 22 to a filter circuit comprising resistors $R_3$, $R_4$ and a condenser $C_2$. The grid lead 21 is provided with a terminal 24 connected thereto through a coupling condenser 25. The tube 10 may be triggered by a source of synchronizing pulses applied to the terminal 24.

A source of current either direct or alternating can be applied across the terminal 15 and ground connection 26 for operation of the generator. Assuming that a source of alternating current is applied, the tube may be biased by adjustment of the tap 23 on the resistor $R_4$ to cause the tube to fire at or near the crest of a positive half cycle of the alternating current. The conduction of the tube charges the condenser $C_1$, the resistor $R_1$ controlling the flow of the charging current.

Referring to Fig. 2, the alternating current source is shown as a sinusoidal wave 30 although other wave forms may be used. The firing point of the tube is shown, for purposes of illustration, to occur at 31 which corresponds to the positive crest of a cycle of the wave 30. The firing interval continues until the condenser $C_1$ is charged to a point where the potential on the cathode 13 approaches the potential on the anode 11 at which point the ionization of the tube is extinguished. This point is indicated as 32 in Fig. 2. The slope 33 indicates the rate of discharge of the condenser in accordance with the time constant provided by the condenser $C_1$ and resistor $R_2$. This time constant is preferably so selected that the condenser $C_1$ will be substantially discharged by the occurrence of the next succeeding crest of the alternating current wave 30. It will be understood, however, that by making suitable choice of the time constants, the tube can be made to fire several times in one cycle, once per cycle or once every two, three or more cycles.

The portion of the wave defined by the build-up between 31 and 32 represents the leading edge of the saw-tooth wave while the slope 33 represents the trailing edge. Where the saw-tooth wave is used for controlling the deflection of the beam of a cathode ray tube, the lower portion of the leading edge which is substantially linear is preferred. In the case of radio detection apparatus such as defined in the aforementioned copending application of E. Labin, this lower portion 31 to 34 of the leading edge may be applied to the deflection plates of the oscillograph to produce a sweep A—B, to follow immediately after the transmission of an impulse 35. Pulse energy synchronized with impulses 35 may be used to synchronize the firing of the tube 10. The magnitude of the voltage for the leading edge of the saw-tooth potentials may be as great as 200 volts or more for an alternating current supply of 450 volts peak. This figure is given by way of example only and is not to be regarded as limiting.

As hereinbefore mentioned, the condenser $C_1$ when discharged retains a residual charge of the amount $V_1$. Thus the cathode 13 has a direct current component of positive voltage with respect to ground. This voltage $V_1$ I use in the present circuit as a source of bias for the tube 10. The filter comprising resistors $R_3$, $R_4$ and the condenser $C_2$ functions for the purpose of controlling the grid bias due to this residual voltage $V_1$ or the grid 12. This bias may be adjusted by varying the position of the tap 23. If this bias is made large enough the tube will not fire even at the positive crest of a cycle. This is sometimes desirable where the firing must be closely synchronized, such as with the transmission of impulses 35. Should direct current be supplied instead of alternating current, some voltage variation such as a synchronizing pulse would then be desirable to trigger the tube 10.

In Fig. 3, I show a modified form of saw-tooth voltage wave generator in which the generated saw-tooth voltage is balanced to ground. An alternating current source is provided at the primary 40 of the transformer 41 and the secondary 42 thereof, which is grounded at its midpoint 43, is connected at its ends to the circuit which includes a first gas discharge tube 45 and a second gas discharge tube 46. The anode 47 of the tube 45 is connected through a resistor $R_5$ to one of the secondary connections 48. The cathode 49 of the tube 46 is connected through a resistor $R_6$, a resistance-capacity circuit 50 comprising a resistor $R_7$ and a condenser $C_3$ to the opposite connection 52 of the secondary 42. Two energy storing condensers $C_4$ and $C_5$ are provided between the cathode 54 of the tube 45 and the anode 55 of the tube 46. A connection 60 between the two condensers is connected to ground and also provides an output terminal E. Connected to the terminal of the cathode 54 is a terminal D, and shunting the condenser $C_4$ between the terminals D and E is a resistor $R_8$. A third output terminal F is connected to the terminal of the anode 55, and shunting the condenser $C_5$ between terminal E and F is a resistor $R_9$. The grid 62 of the tube 45 is connected through a coupling condenser 63 to an input 64 for synchronizing pulses. The grid 62 is connected through a high resistor 65 to a point of negative bias. The grid 67 of the tube 46 is likewise connected by a resistor 68 to a point of negative bias at the lead connection 52 to the R–C circuit 50. If the resistance-capacity product of the network 50 is large enough it will have no appreciable effect upon the charging time of the condensers $C_4$ and $C_5$, but will furnish a bias for the tube 46 similarly as stated in connection with the form of Fig. 1. The grid 67 is also connected by a circuit 69 through a condenser $C_6$ to the terminal of the cathode 54 of the tube 45. This connection will normally provide a triggering potential or pulse for the tube 46 when the tube 45 is fired.

As a precaution for insuring substantially simultaneous firing of the two tubes, I provide a circuit 70 having a condenser $C_7$ connecting the grid 62 to the cathode 49. This circuit corresponds to the circuit 69. It will be observed that the circuit of the tube 45 is similar to the circuit shown in Fig. 1. The circuit of tube 46, however, is inverted with respect to the circuit of the tube 45. This arrangement provides for a voltage output between the terminals E and F which is opposite in polarity to the voltage output between the terminals D and E. Thus an output balanced to ground is obtained.

When the tube 45 fires a pulse is impressed upon the grid 67 through the connection 69 thereby causing the tube 46 to fire. If the tube 45 is synchronized by pulses supplied through the terminal 64, the sequence of firing is as described in connection with the form of Fig. 1. If the firing is not to be synchronized with external pulses, the tube 46, in the absence of circuit 70, may then fire before the firing of the tube 45. The circuit 70, however, insures that the tube 45 will be triggered by the firing of the tube 46.

Should the bias to the tubes 45 and 46 be not too negative, the positive half of an alternating current supplied to the leads 48 and 52 will trigger the tubes to fire at approximately the same potential of each cycle. I prefer, however, to make the bias so negative that the tubes will not fire due to the positive portions of the alternating current. The firing is then controlled by a source of synchronizing pulses applied to the grid input 64 in which case circuit 70 is not required.

In Fig. 4 I show the circuit of Fig. 1 modified to receive bias from an alternating current source 80. Where the circuit parts are duplicated I use the same reference characters used in Fig. 1 and description of such parts need not be repeated. The source 80 is applied to the circuit through a transformer 82. One end 84 of the secondary 83 is connected to the anode 11 through the resistor $R_1$. A potentiometer 86 is connected across a portion of the secondary 83 at the opposite end 85 thereof with the tapped part 88 of the secondary grounded. By proper adjustment of the potentiometer contact 90, satisfactory bias can be obtained for the grid 12 from the alternating current source.

While the circuits of Figs. 3 and 4 are shown with sources of alternating current applied thereto, it will be understood that direct current may be substituted therefor.

While I have described above the principles of my invention in connection with two forms of apparatus, it is to be clearly understood that this description is made only by way of example and not as a limitation on the scope of my invention as set forth in the objects thereof and the appended claims.

What I claim is:

1. A system for producing saw-tooth voltage balanced to ground comprising a first gas discharge tube, a second gas discharge tube, a pair of condensers connected in series between the tubes, the connection common to the two condensers being connected to ground, means to apply a source of power across said tubes and condensers in series, means to cause said tubes to fire substantially simultaneously to thereby charge said condensers, the firing of said tubes being extinguished when a predetermined potential build-up is reached on said condensers, and means to control the discharge of said condensers.

2. The system defined in claim 1 wherein the source of power applied across the tubes is alternating current, and the means to cause the tubes to fire comprise adjustable bias means arranged to bias the tubes for firing at a predetermined point on the rising portion of the positive half-cycle of the alternating current.

3. A system for producing saw-tooth voltage balanced to ground comprising a first gas discharge tube, a second gas discharge tube, a pair of condensers connected in series between the tubes, the connection common to the two condensers being connected to ground, voltage supply means to apply a source of power across said tubes, means to cause said tubes to fire substantially simultaneously, the firing of said tubes being extinguished when a predetermined potential build-up is reached on said condensers, means to control the discharge of said condensers, said gas discharge tubes each including anode, cathode and grid electrodes, the source of power applied across the tubes being alternating current, bias means included in said voltage supply means to bias the tubes for firing at a predetermined point on the rising portion of a positive half-cycle of the alternating current, and means coupling the grid of each tube to the cathode of the other tube so that regardless of which tube fires first the firing thereof will operate to trigger the other tube.

4. The system defind in claim 1 wherein the means to cause the tubes to fire comprises means to trigger the first tube to fire in response to a synchronizing pulse, and means including a grid for the second tube coupled to the output of the first tube to cause the second tube to fire in response to the firing of the first tube.

ALBERT PREISMAN.

REFERENCES CITED

The following references are of record in the file of this patent:

UNITED STATES PATENTS

| Number | Name | Date |
|---|---|---|
| Re. 21,400 | Blumlein | Mar. 19, 1940 |
| 2,231,591 | Pieplow | Feb. 11, 1941 |
| 2,259,284 | Baldwin | Oct. 14, 1941 |
| 2,288,554 | Smith | June 30, 1942 |
| 2,292,100 | Bliss | Aug. 4, 1942 |

FOREIGN PATENTS

| Number | Country | Date |
|---|---|---|
| 426,002 | Great Britain | Mar. 26, 1935 |
| 488,842 | Great Britain | July 14, 1938 |